United States Patent Office 3,278,342
Patented Oct. 11, 1966

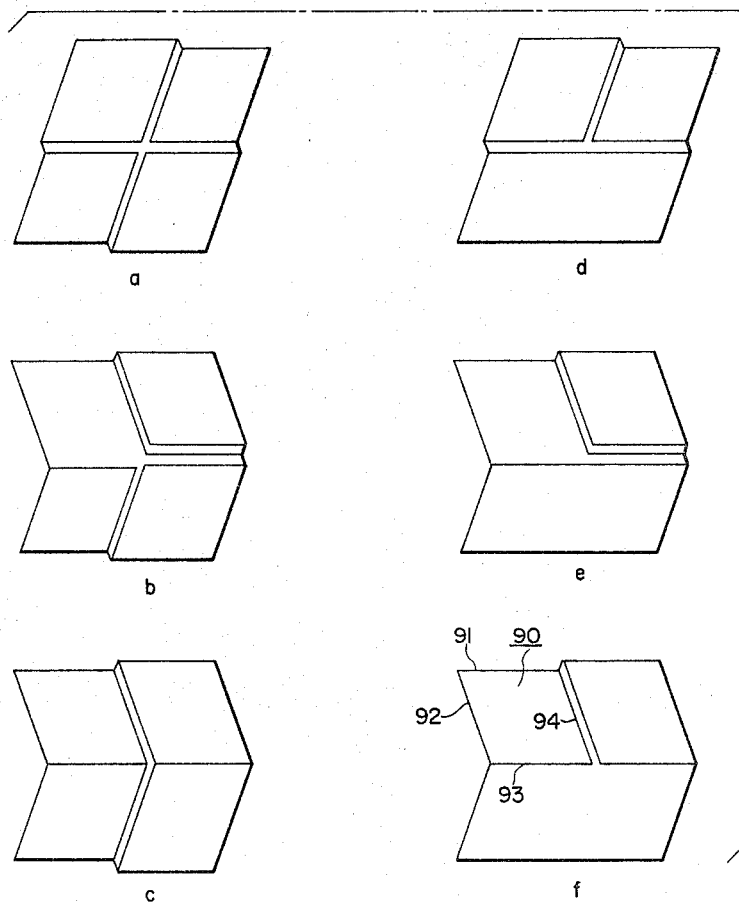
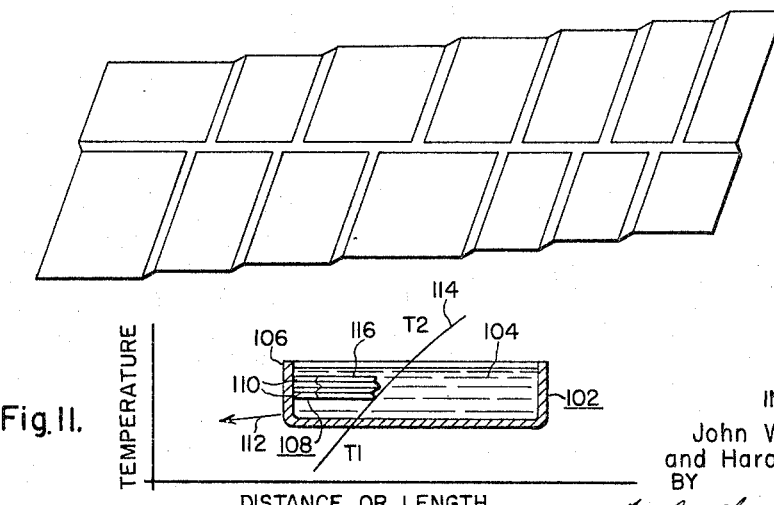
Fig.3.
Fig.4.
Fig.11.

3,278,342
METHOD OF GROWING CRYSTALLINE MEMBERS COMPLETELY WITHIN THE SOLUTION MELT
Harold F. John and John W. Faust, Jr., Pittsburgh, Pa., assignors to Westinghouse Electric Corporation, Pittsburgh, Pa., a corporation of Pennsylvania
Filed Oct. 14, 1963, Ser. No. 316,047
23 Claims. (Cl. 148—1.6)

This invention relates to the process of producing crystals of solid materials and in particular of semiconductor crystals.

At the present time, the diverse means currently in use for growing crystalline members of such quality as to be suitable for use in semiconductor applications including crystal growth from melts both above and below the melting point of the crystal materials sometimes involve serious difficulties because of the relatively high temperatures often encountered and the attendant vapor pressure and occassionally even material decomposition problems. That is, serious problems are often encountered by way of vapor pressure or material decomposition caused by the relatively high temperatures required to produce crystals by many of the means currently in use.

Further, the means currently employed in forming semiconductor devices, such as P-N junction structures, often prove cumbersome and it is thus highly desirable to provide a method for producing such directly in the crystal growing process, particularly in certain semiconductor materials where more standard means of producing P-N junctions are difficult. An example of such a material is gallium phosphide which requires a lengthy fusion process with the attendant decomposition and vapor pressure problems.

An object of the present invention is to provide a process for producing crystalline members of such quality as to be suitable for service in semiconductor applications.

A further object of the invention is to provide for producing doped crystalline structures of such quality as to be suitable for service in semiconductor applications.

Another object of the invention is to provide a process for the production of crystalline members characterized by at least two layers of alternating semiconductivity or at least two adjacent regions of resistivity and of such quality as to be suitable for service in semiconductor applications.

Another object of the invention is to provide a process for producing crystalline members of materials crystallizing in the face centered cubic, diamond cubic or zinc blend, hexagonal or orthorhombic lattice structures and capable of crystal growth in solution by the reentrant edge mechanism, the members being of such quality as to be suitable for service in semiconductor applications.

Another object of the invention is to provide for crystalline members, plate-like in structure, and characterized by at least two twin planes extending therethrough, and, further, characterized by at least two layers of alternating semiconductivity or variable resistivity.

Another object of the invention is to provide for crystalline members characterized by at least two intersecting twin planes extending therethrough and being of such quality as to permit use in semiconductor applications.

Other objects of the invention will in part, be obvious and will, in part, appear hereinafter.

For a better understanding of the nature and objects of the invention, reference should be had to the detailed description below and the following drawings, in which.

Figure 7:
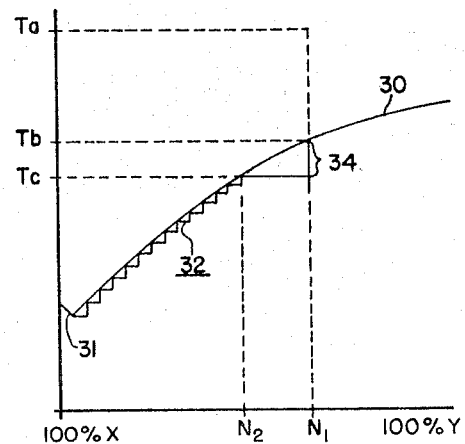
Figure 10:
Figure 9:
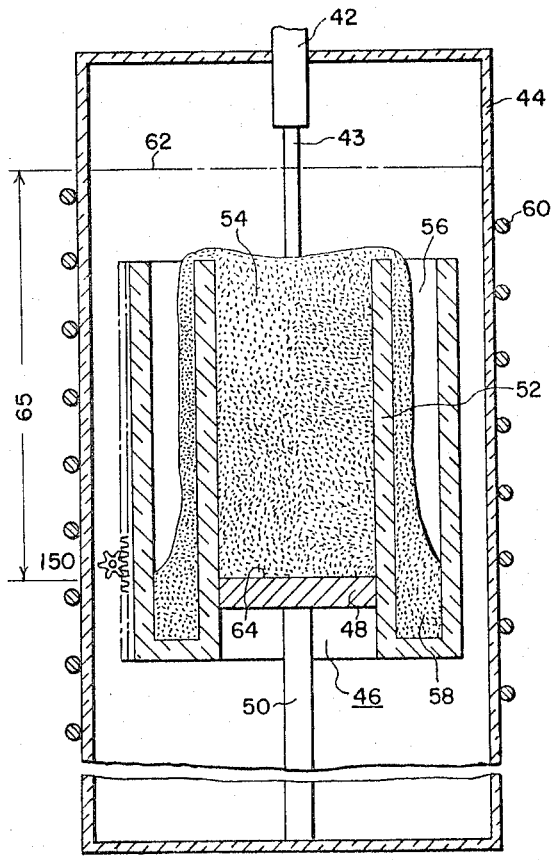
Figure 8:
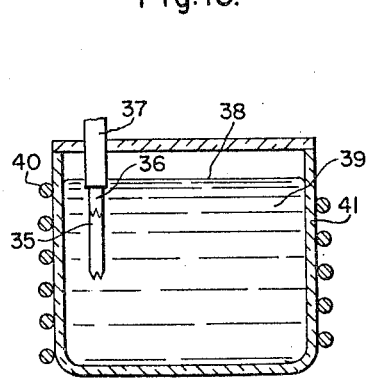
Figure 5:
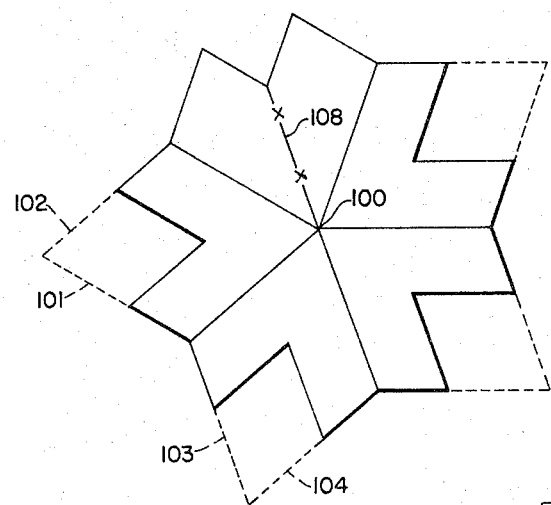
Figure 6:
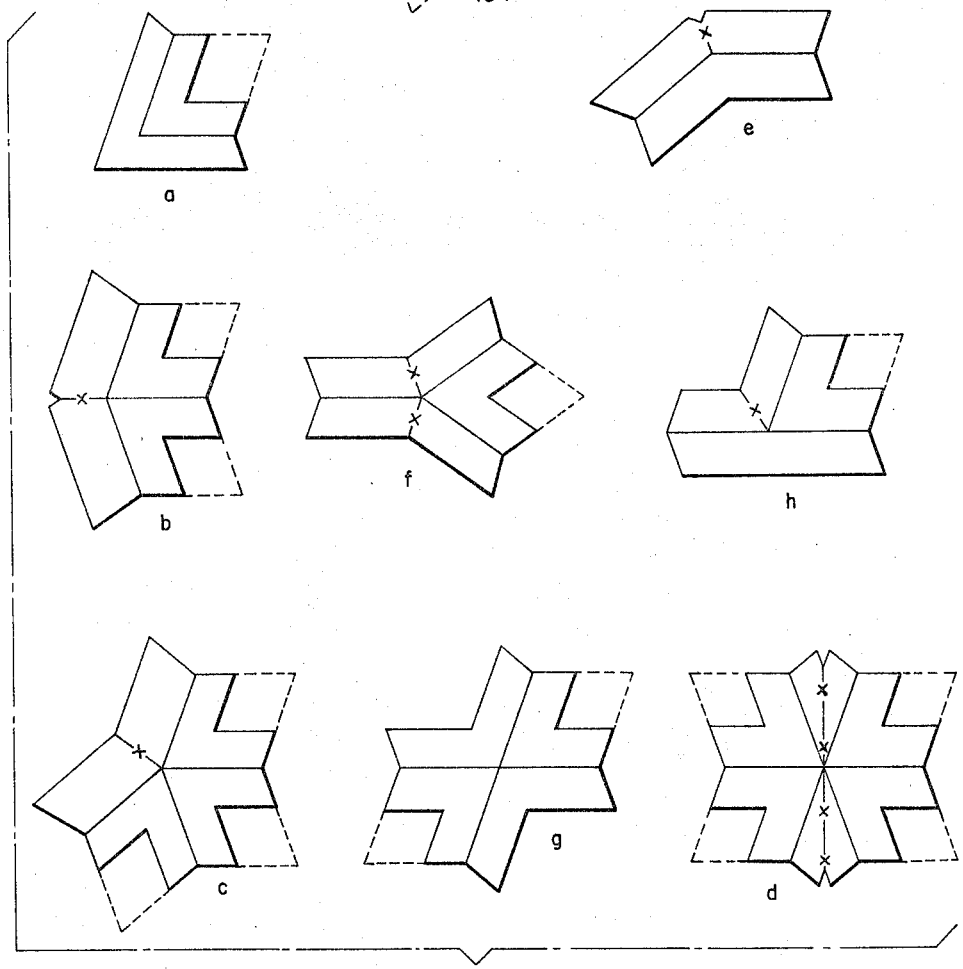

FIG. 3, $a$ through $f$, are greatly enlarged cross sections of crystals exhibiting twin planes;

FIG. 4 is a greatly enlarged cross section of a crystal exhibiting twin planes;

FIG. 5 is a greatly enlarged cross section of a crystal exhibiting twin planes;

FIG. 6, $a$ through $h$, are greatly enlarged cross sections of crystals exhibiting twin planes;

FIG. 7 is a graph plotting the concentration vs. temperature showing the liquidus curve;

FIG. 8 is a schematic cross sectional elevation showing an apparatus which may be used in practicing the process of the invention;

FIG. 9 is a schematic cross sectional elevation showing an apparatus which may be used in practicing the process of the invention;

FIG. 10 is a greatly enlarged cross section of a crystal exhibiting parallel twin planes and layers of alternating semiconductivity types; and FIG. 11 is a combination cross sectional elevation and diagrammatic illustration of an apparatus and method of practicing the invention.

Basically the invention pertains to a process of producing crystalline members, the members being of requisite structure and quality as to be suitable for use in semiconductor applications, whereby such members are grown from a solution melt containing the basic material of the member together with any desired dopants or other desired impurities in a suitable solvent. Normally when such a solution is cooled below the liquidus point, to some extent crystal formation occurs. These crystals are for the most part irregular in shape and exhibit various other characteristics which render them unsuitable for use in semiconductor applications without considerable further processing. It has been found however that by appropriate precise temperature control, crystals produced on cooling such a solution will, to a very great extent possess such qualities as to be quite suitable for use in semiconductor applications. Any such crystal as produced by this invention will always exhibit at least one twin plane extending therethrough.

Figure 1:
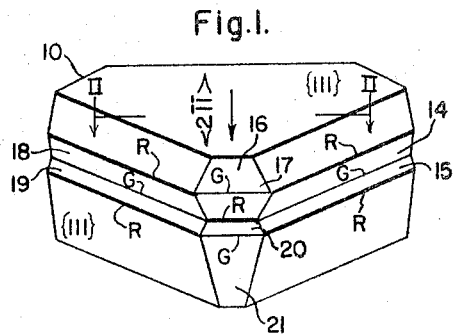
FIGURE 1 is an isometric view, greatly enlarged, of a crystal platelet bounded by {111} planes.
Figure 2:
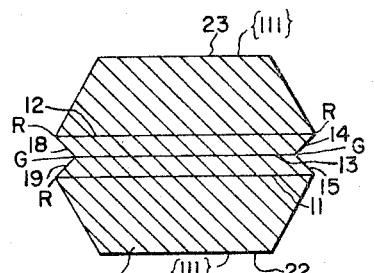
FIG. 2 is a cross section of the crystal shown in FIGURE 1, on line II—II, exhibiting the parallel 111 twin planes and re-entrant edges.

Materials crystallizing in the face centered cubic, diamond cubic or zinc blende lattice structure will always exhibit at least two twin planes and will be bounded by {111} faces, or sometimes by {111} faces plus secondary faces such as {100} faces. However, materials crystallizing in the hexagonal or orthorhombic lattice structure may exhibit as few as a single twin plane extending therethrough. Crystals of face centered cubic, diamond cubic, and zinc blende structures formed by the process of the invention will generally exhibit a plate-like structure characterized by parallel {111} faces as illustrated in FIGURES 1 and 2. However, other shapes such as those shown in FIGS. 3 through 6 are additional structures.

Crystal growth by the process of the invention occurs principally by the twin plane reentrant edge mechanism which is known in the art in relation to growth from supercoated melts. This mechanism is, briefly, the preferential nucleation at the reentrant edges formed by the twin planes and the {111} faces, as shown in FIGURE 1 and FIG. 2.

Referring to FIGURE 1, which illustrates a platelet 10 of a material crystallizing in the face centered cubic, diamond cubic or zinc blende lattice structures, the four re-entrancies formed respectively by faces 14 and 15, faces 16 and 17, faces 18 and 19 and faces 20 and 21 are observable. Four purposes of clarity in viewing FIGURE 1, it is to be noted that the edges formed by the twin planes and the {111} boundary faces are designated "R" for ridge and "G" for groove, respectively. The re-entrancies, of course are the groove-like edges G as is emphasized in FIG. 2.

Referring now to FIG. 2, a cross section through FIGURE 1, it is to be noted that 11, 12 and 13 are twin planes extending through the crystal 10 and parallel to 22 and 23 which are the parallel faces of the flat crystal. During growth of such a crystal, nucleation is favored at the twin plane re-entrancies, such as 18 and 19 and 14 and 15. That is, during crystal growth, a marked preference for nucleation at these twin plane re-entrancies is exhibited such that growth in a direction parallel to the twin planes is very pronounced as opposed to growth outward from the flat crystal faces 22 and 23 in FIG. 2 which latter would make the crystal platelet thicker and which would occur by two dimension nucleation on these faces, 22 and 23. Thus, such a crystal will grow much more rapidly in the direction of the twin planes, thereby extending the length and width of the flat crystal but not appreciably, relatively speaking, increasing its thickness. We find nucleation during crystal growth is so favored on the twin plane re-entrant edges much less supercooling is required to grow onto such an edge as opposed to the flat plate-like surfaces such as 22 and 23 in FIG. 2, where any growth must occur by the two dimensional nucleation mechanism requiring a much greater amount of supercooling. Thus by maintaining a solution melt at a slightly supercooled temperature but not supercooled sufficiently to encourage appreciable growth by mechanisms other than the re-entrant edge mechanism, growth can be controlled so as to occur predominantly on the edge of a flat crystal.

To illustrate the effect of temperature control in the practice of the invention, reference should be made to FIG. 7 which shows a phase diagram of a solution comprising solute Y dissolved in solvent X wherein the abscissa indicates the relative proportions of the ingredients X and Y and the ordinate indicates the temperature. The area above line 30 is liquid, the area below line 30 being solid; thus line 30 is the liquidus curve, that is, the point at which a given concentration will theoretically begin to freeze or melt depending on the direction of temperature change. If the solution is suitably free of solid impurities, cooling it down to the liquidus line will not immediately produce any crystal formation, that is, some degree of supersaturation will be required in the absence of some solid nuclei. For purposes of illustration consider a solution of solute Y in solvent X at composition $N_1$ and at temperature $T_a$ in FIG. 7. Note that $T_a$ is above the liquidus temperature thus indicating that the solution is a liquid. If the temperature is lowered no crystallization will occur at temperature $T_b$ (the liquidus temperature) since no nuclei are present. At some supersaturation temperature, for example at temperature $T_c$, solute nuclei will spontaneously form at an appreciable rate in the solution. Usually many solute nuclei will form throughout the solution within a relatively narrow temperature range. If the solute Y has a face centered cubic, diamond cubic, zinc blend, hexagonal or orthorhombic crystal structure, many, or at least an appreciable number, of the nuclei will exhibit twin planes. Growth onto these original nuclei removes the supersaturation in the solution and restores the composition of the solution to its equilibrium value, composition $N_2$ at temperature $T_c$. Growth during the time the initial supersaturation is being relieved will probably occur onto both twinned and untwinned nuclei. If subsequent cooling proceeds slowly enough, growth at the reentrant corners formed by the twin planes will be markedly favored, since the amount of supercooling must be so much greater to cause two dimensional nucleation onto a {111} surface than to cause nucleation in the reentrant edges. Thus, only those nuclei containing twin planes grow appreciably larger. Further, many of the non-twinned nuclei will return into solution to be later removed from solution by growth on twinned crystals, thus increasing the size of the twinned crystals and, further, decreasing the yield of un-twinned crystals. To utilize to the greatest extent this preference for nucleation at the reentrant edges, each incremental decrease in temperature, or the rate of temperature decrease, must be sufficient to cause only a small degree of supersaturation, as indicated in FIG. 7. That is, since only a small degree of supercooling is required to induce crystal growth by the re-entrant edge mechanism, any rate of supercooling less than that at which substantial crystal growth will occur by other mechanisms, such as the two dimensional nucleation mechanism, is suitable for the practice of the invention.

Generally speaking, in cooling a solution or melt, once the theoretical liquidus temperature is reached, the melt may be cooled, if desired, as slowly as available time and equipment permit. It should be noted, in this respect, that the slower cooling rates prompt the formation of fewer but larger sized crystals than do the faster cooling rates. For example, a cooling rate of .1° C./min. for a given solution melt, will induce the formation of fewer but larger sized crystals than a rate of 2° C./min. However, any cooling rate within the prescribed limit of this invention, less than that at which substantial nonreentrant edge growth will occur, will produce satisfactory crystal growth. Exceeding this limit will result in irregular shapes, such as perfect or imperfect octahedra, which offer little, if any, value in semiconductor or other rigorous applications without considerable difficulty. Usually, cooling rates up to 3° C./min. are preferred.

Thus, (1) forming a solution melt of the material to be grown in a suitable solvent, normally at a temperature somewhat above the liquidus point to assure complete solute solution, (2) bringing it to a temperature substantially at the liquidus point, and (3) cooling the melt at a rate within the critical limit outlined above, will result in the solute forming crystals suitable in quality for semiconductor applications.

Using the technique indicated above a number of materials may be grown in platelet form as indicated in the illustrative examples tabulated in the tables. Referring to the table, there are illustrated examples of preferred composition ranges for various solution constituents, Table I, together with 25 specific solution composition examples, Table II.

EXAMPLES OF SOLUTION GROWTH OF TWINNED CRYSTALS

TABLE I

| Solute and Preferred Composition Range, Wt. Percent | Examples of Suitable Solvents |
|---|---|
| Ge, 3% to 34% | Ga, Al, Au, Sn, In, Pb, Ag. |
| Si, 1% to 25% over the eutectic composition | Al, Au, Ag, Ga, Sn, Zn. |
| InSb, 5% to 50% | In, Hg, Sn, Pb. |
| InAs, 2% to 15% | In. |
| InP, 2% to 25% | In. |
| GaSb, 5% to 30% | Ga, Sn, Pb. |
| GaAs, 1% to 15% | Ga. |
| GaP, .5% to 5% | Ga, Sn, Bi, In. |
| AlSb, 5% to 20% | Al. |
| AlAs, .5% to 5% | Al. |
| SnZnAs$_2$, 5% to 20% | Sn. |
| Cu, .5% to 5% | Tl. |
| Ni, 1% to 4% | Tl. |
| Au, 30% to 50% | Tl. |
| SiC, .1% to 1% | Si, Cr. |

TABLE II

| Example | Solution Composition, Wt. Percent | Initial Temp., °C. | Constant Cooling Rate, °C./minute |
|---|---|---|---|
| 1 | 34% Ge, 66% Ga | 600 | .7 |
| 2 | 80% Sn, 12% Ge, 8% Sb* | 620 | .7 |
| 3 | 83% In, 16.3% Ge, .7% As* | 610 | .7 |
| 4 | 25% Si, 75% Al | 800 | .7 |
| 5 | 6.5% Si, 93.5% Au | 800 | .7 |
| 6 | 94% Ag, 5% Si, 1% Sb* | 970 | .7 |
| 7 | 4.5% Si, 95% Ga | 980 | 1.5 |
| 8 | 1.5% Si, 98.5% Sn | 980 | 1.5 |
| 9 | 46.7% InSb, 53.3% In | 480 | .7 |
| 10 | 46.7% InSb, 53.3% In, .3% Zn* | 480 | .7 |
| 11 | 46.7% InSb, 52.3% In, 1% Te* | 480 | .7 |
| 12 | 23% InAs, 77% In | 750 | .2 |
| 13 | 14% InP, 86% In | 970 | .7 |
| 14 | 26.8% GaSb, 73.2% Ga | 650 | .7 |
| 15 | 15% GaSb, 85% Sn | 650 | .7 |
| 16 | 8% GaSb, 92% Pb | 650 | .7 |
| 17 | 5.1% GaAs, 95% Ga | 950 | 1.3 |
| 18 | 0.8% GaP, 99.2% Ga | 960 | .7 |
| 19 | 9.8% AlSb, 91.2% Al | 960 | .7 |
| 20 | 0.5% AlAs, 99.5% Al | 950 | 1.3 |
| 21 | 95.4% Sn, 3.2% As, 1.4% Zn | 800 | 1.3 |
| 22 | 1.5% Cu, 98.5% Tl | 900 | 1.0 |
| 23 | 1% Ni, 99% Tl | 800 | .7 |
| 24 | 50% Au, 50% Tl | 600 | .7 |
| 25 | .2% SiC, 99.8% Si | 1,650 | .7 |

*Dopants.

As can be seen from the illustrative examples in Table II, the initial melt composition and temperature may vary with the specific materials involved. The initial temperature $T_a$ is dependent upon the melt composition and is determined from a phase diagram, such as FIG. 7, for the specific melt composition applicable. The initial temperature is generally slightly above the liquidus point, although any temperature substantially at the liquidus point is satisfactory, the former being preferred to assure complete melting and intermixing of the melt constituents. The composition selected will generally range from slightly over 1% to slightly under 50% by weight solute. Generally when it is desired to form small, well shaped platelets, a low solute concentration is preferable, for example 1% to 15% by weight solute. Higher solute concentrations, because of the density of crystal formation in the melt tend to result in larger and less perfectly shaped crystals. Thus, to some extent the size and shape of crystals can be controlled by solute concentration. Also, as indicated earlier, the size of the crystals formed is further influenced by the rate of supercooling used. Another factor in melt composition selection is the liquidus temperature for a given composition which may be considered impractical if excessive thus indicating some other composition would be preferable from a temperature standpoint.

The temperature decrease may be accomplished by incremental, or step type changes, or in most cases by a constant rate as desired. In all the examples tabulated in Table II a constant, rather than step change, cooling rate is used.

For some materials it may be necessary in the initial stage of cooling to increase the rate slightly so as to promote the initial formation of twinned nuclei. That is, if the initial rate of temperature decrease is too slow, it is possible that twinned nuclei will not form. In such a case the initial rate of temperature decrease should be increased to the extent required to effect formation of twinned nuclei. This increased initial decrease for some materials might range from about 3° to 30° C. For most materials however, this initial operation is not required. That is, a constant rate of temperature decrease such as the rate indicated by 32 in FIG. 7 and the rates indicated in examples tabulated in Table II may be used from the start of the cooling operation. However, as mentioned above, in some isolated cases it is possible that superior results may be achieved by the use of a relatively large initial temperature decrease such as indicated by 34 in FIG. 7 followed by the slower rate, 32 in FIG. 7, once twinned nucleation has been achieved. This is especially applicable where a very slow rate of cooling is contemplated in order to form larger sized crystals. In such an instance a large initial temperature decrease may be highly useful in achieving twinned nucleation which might not occur to the extent desired if the very slow cooling rate is used from the start of the cooling operation.

As a modification of the basic invention, which produces materials which, while suitable for use in semiconductor applications, are somewhat short, generally less than 1 centimeter, in overall length, extended lengths, in the order of several centimeters, may be produced. This modification for producing extended lengths of crystals simply involves starting with a seed crystal exhibiting twin planes extending therethrough, then cooling a melt in which these seeds are placed in such a fashion as to promote preferential growth upon the crystals in a direction parallel to the twin planes. That is, for purposes of illustration, if the crystals formed in the process of the basic invention are subsequently placed in another similar solution melt and oriented such that the twin planes are aligned in a direction with a cooling thermal gradient, a 211 direction for configurations of the type shown in FIGURE 1 and a 110 direction for the twin configuration shown in FIGURES 3 through 6, extended growth would result.

Referring now to FIG. 8, extended crystal growth may be achieved simply by immersing the seed 36, supported by a suitable means 37, at the surface 38 of a solution melt 39 contained in a furnace 41 or some other heating apparatus with the twin planes of the seed oriented vertically and then lowering a heating coil 40 around the melt vertically downwards such as to create a downward thermal gradient with isotherms moving downward. Several seeds could be so situated if desired. This would effect preferential growth upon the seed crystals by the reentrant edge mechanism and in the direction of the downward thermal gradient resulting in extended growths such as 35 in FIG. 8 downwards into the melt. Thus, by appropriate nuclei or crystal seed orientation combined with relatively precisely controlled temperature gradient direction extended lengths of the seed crystal may be obtained.

It is to be noted that if the seed is produced by the basic solution growth process of the invention, the solvent used in the extended growth need not be the same solvent used in producing the seed. That is, in general, a seed crystal of gallium antimonide produced by solution growth in a gallium solvent may be used to produce extended lengths by solution growth in a tin solvent, if so desired.

It is to be also noted that while the seed used to produce the extended solution growth may be produced by the basic solution growth process of this invention, such is not a requirement. That is, any seed crystal exhibiting the requisite member of twin planes extending therethrough will be sufficient. As mentioned earlier the requisite number of twin planes required for crystal growth by the process of this invention are (1) at least one for material crystallizing in the hexagonal or orthorhombic lattice structures, or (2) at least two for materials crystallizing in the diamond cubic, zinc blende or the face centered cubic lattice structures.

FIGURE 9 illustrates diagrammatically another method of obtaining extended growth of seed crystals. The principal advantage of this method is that the portion of the solution from which growth has depleted some solute is removed from the extended crystal length as it is grown. Referring now to FIG. 9, seed 43 is fixed onto a rod 42 at the top of the furnace 44 or other heating apparatus. The crucible 46 consists of two parts, the bottom 48 is a stationary member supported by post 50 and fits into the sides 52 so that the sides 52 will slide smoothly yet have a tight enough fit to contain the solution 54. The sides 52 comprise a cylinder with an annular area 56 to catch excessive solution 58 removed from the extended crystal length. The motion of the crucible sides 52 and the heater 60 are synchronized. At the start of the growth the sides 52 are at the seed elevation 62 so that the seed is just immersed in the solution melt 54. As the growth continues the sides 52 are lowered at the growth rate. The solution 54 flows into the annular space 56 in the sides 52. This keeps the solution from the extended crystal faces already grown and also assures a relatively constant solution concentration at the seed interface. The spacing between the initial seed position (at line 62) and the bottom 64 of the crucible is kept constant but can be adjusted to the desired growth length 65 before the solution melt 54 is added. The solution melt 54 is added as a solid with the correct composition to give a saturated solution at the growing temperature or as a liquid or powder as desired. After the extended platelet has been grown the solution can be removed from the annular space 56 by chemical or heating means.

As yet another method of practicing the extended crystal length modification of the basic invention reference should be made to FIG. 11 which illustrates diagrammatically a boat containing the solution melt moving horizontally through a temperature gradient. Referring to FIG. 11, 102 is a quartz boat or similar container holding the solution melt 104. Against the forward edge 106 of the quartz boat is positioned a seed crystal 108 with its twin planes 110 oriented in the horizontal plane, the desired plane of crystal growth. The boat with the solution melt is passed in the direction indicated by the arrow 112 through a horizontal temperature gradient 114 ($T_2$ minus $T_1$) thereby inducing the extended crystal growth 116 onto the original seed.

Obviously, the extended growth modification of the invention may be practiced by procedures other than those illustrated in FIGS. 8, 9 and 11 and described above, and it is intended that the scope of the invention extend to such other procedures.

As another application of the basic invention, multiple resistivity semiconductor structures or devices can be produced. That is, a crystalline member characterized by layers of alternating semiconductivity types may be produced either as relatively small sized members as by the basic invention or as extended lengths as by the modification of the basic invention described above and illustrated in FIGS. 8 and 9. An illustration of such a device is shown in FIG. 10 which shows a section through a flat crystal exhibiting alternating semiconductivity layers. Referring now to FIG. 10, 70, 72 and 74 are layers of n-type and 76 and 78 are layers of p-type semiconductivity. Twin planes are indicated by 80 and 82. It is to be noted that the twin planes need not coincide with nor equal in number the semiconductor layer boundaries. If desired, the crystal may be severed at an angle, such as plane 84 in FIG. 10, to offer a larger area for attaching electrical connections. Production of these members is accomplished by selecting a suitable pair of dopants of opposite semiconductivity types or by the addition of dopants part way through growth. Such structures would result if the segregation coefficient of one dopant were influenced in a different manner by changes in growth velocity than the segregation coefficient of the other dopant. This effect is perhaps best explained by visualizing a crystal growing in a solution containing two such type dopants with concentration selected such that for a relatively slow growth rate the p-type impurity would predominate in the crystal, but for a relatively fast growth rate the n-type impurity would predominate in the crystal. Thus by deliberately changing the thermal conditions during growth the conductivity type of the crystal could be changed one or more times as desired. It is to be noted in this respect that reference to fast and slow growth rates is relative. That is, both are the result of the basic supercooling effect limitation of the invention: the rate of supercooling must be below that at which substantial crystal growth will occur by mechanisms other than the twin-plane re-entrant edge mechanism. It is to also be noted in this respect that when slowly cooling a melt, natural fluctuations in cooling rate will be encountered quite often. These natural fluctuations in cooling rate are often sufficient to periodically vary the conductive type or resistivity of a crystal which will exhibit striations of alternating semiconductivity or varying resistivity in accordance with the number, type and concentrations of the dopants selected.

Layers of alternating conductivity type would also be produced if one of the dopants tended to be exhausted from the solution during growth and the other dopant rejected into the solution. Since the platelets grow apparently in a series of discrete stages which add layers several microns thick, during each stage, then a p- and an n-type region would be produced in each of these layers after which the solution surrounding the growing crystal would equilibrate.

Further, material of one conductivity type can also be grown onto twinned crystals of the opposite conductivity type produced in a separate earlier operation such as is illustrated by Examples 29 and 30.

The production of variable resistivity and p-n junction configurations is perhaps best explained and illustrated by the following examples.

Example 26

A mixture containing 79.5% by weight pure metallic indium, 20.0% by weight pure antimony, and 0.5% by weight pure tellurium is heated in an evacuated quartz tube to 500° C. to ensure complete solubility of the antimony solute and tellurium dopant in the indium solvent. After leaving the mixture at this temperature for five minutes, the furnace and the sealed quartz tube containing the solution are cooled at a constant rate of .7° C. per minute. Twinned platelets of indium antimonide crystallize out of solution when the solubility limit of indium antimonide in indium is exceeded, as generally described heretofore in this application. Tellurium is incorporated in the crystal, but in a non-uniform way, to give periodic striations of high tellurium doping. These striations outline the growing interface at a particular time during the growth process. The distance between adjacent regions of maximum tellurium concentration is several microns, the tellurium being incorporated into the indium antimonide more heavily during the initial stage of growth of each striation.

Example 27

A mixture containing 79.4% by weight pure metallic indium, 20.0% by weight pure antimony, 0.5% by weight pure tellurium, and 0.1% by weight pure zinc is heated in an evacuated quartz tube to 500° C. to ensure complete solubility of the antimony and the tellurium and zinc dopants in the indium solvent. After leaving the mixture at 500° C. for five minutes, the furnace and the sealed quartz container with the solution are cooled at a constant rate of .7° C. per minute. Twinned platelets of indium antimonide are formed which contain alternating p- and n-type layers spaced several microns apart. Regions from these twinned crystals are isolated for semiconductor device applications.

Example 28

A mixture containing 83% by weight pure gallium, 16.80% by weight pure antimony, .15% by weight pure tellurium, and .05% by weight pure zinc is heated in a graphite crucible placed in an evacuated quartz container to 650° C. to bring all components into solution. After holding the solution at 650° C. for five minutes, the furnace apparatus and contents are cooled at a uniform rate of .7° C. per minute. Twinned platelets of gallium antimonide are formed which contain alternating p- and n-type layers spaced several microns apart. Regions from these twinned crystals are isolated for semiconductor device applications.

Example 29

A mixture containing 78.9% by weight pure gallium, 21.0% by weight pure arsenic, and 0.1% by weight pure zinc is heated in a graphite crucible to 1100° C. in an evacuated container. After maintaining the temperature at 1100° C. for 15 minutes, the crucible and contents are cooled at a constant rate of .7° C. per minute to give p-type twinned platelets of gallium arsenide. These platelets of gallium arsenide. These platelets are separated from the metallic gallium. In a subsequent separate operation a second melt containing 82.7% by weight pure gallium, 17.0% by weight pure arsenic and 0.3% by weight pure tellurium is heated in a graphite crucible to 1050° C. for 15 minutes and then cooled slowly to 1000° C., in order to exceed slightly the solubility limit of the gallium arsenide in this solution. Only a very small amount of the gallium arsenide crystallizes out of solution at 1000° C. After this solution has remained at 1000° C. for ten minutes to assure equilibrium, the p-type gallium arsenide platelets produced in the first operation are introduced into the second melt. Since the gallium is saturated with gallium is saturated with gallium arsenide at this point in the second melt, substantially none of the gallium arsenide from the p-type platelets of the first melt will go into solution. The temperature is then lowered at a constant rate of .7° C. per minute and n-type gallium arsenide grows onto the p-type gallium arsenide platelets which were added. A p-n junction is thus produced in each platelet. These p-n junctions are very planar being formed at the crystallographic faces of the platelets. Obviously the crystals introduced into the second melt could come from any suitable source. That is, they need not have been prepared in accordance with this invention. The only basic requirement is that these crystals exhibit the requisites for further growth by the practice of the invention, as explained hereinbefore. Also, the crystals may be introduced as part of a solvent melt as illustrated in Example 30.

Example 30

Two separate mixtures are prepared in one quartz container. In one region of a quartz container is placed the first mixture comprising 92.5% by weight pure gallium, 7.4% by weight gallium phosphide, and 0.1% by weight pure zinc. In another separate region of the same container is placed a second mixture comprising 89.1% by weight pure gallium, 0.9% by weight gallium phosphide and 10% by weight pure tin. The quartz vessel containing these separate mixtures is evacuated to approximately $10^{-5}$ mm. Hg of pressure and heated to 1100° C. for 15 minutes to bring all the gallium phosphide into solution. The container with the two separate melts is cooled at a constant cooling rate of 0.2° C. per minute down to 950° C. During this time twinned p-type platelets of gallium phosphide grow from the first mixture. At this temperature very little if any crystal growth has occurred in the second mixture because the concentration of gallium phosphide was adjusted so that its solubility limit would be exceeded only below the halting temperature of 950° C. When the temperature reaches 950° C., the quartz container is tilted so that the second mixture pours into and mixes with the first mixture. The constant temperature decrease, 0.2° C. per minute, is resumed. But now substantially all the gallium phosphide which crystallizes onto the original p-type gallium phosphide platelets is n-type, because of the tin dopant. Thus, very planar p-n junctions are produced at the boundary between the p-type platelets formed in the first stage and the tin doped n-type material which is grown in the second stage. Obviously this method may be employed to form multiple junctions such as p-n-p devices by progressively adding appropriate solution melts.

Basically speaking, any material capable of crystal growth in solution by the re-entrant edge mechanism will produce satisfactory growths in the process of this invention. That is, the solute material may be any material capable of crystal growth in solution by the re-entrant edge mechanism. The invention is particularly applicable to crystal growth of (a) materials crystallizing in the diamond cubic lattice structure such as the element silicon, (b) materials crystallizing in the zinc blende lattice, such as stoichiometric compounds having an average of four valence electrons per atom, including those comprising substantially equi-molar proportions of an element from Group III of the Periodic Table and particularly aluminum, gallium, and indium combined with an element from Group V of the Periodic Table and particularly phosphorus, arsenic, and antimony as well as those compounds comprising stoichiometric proportions of Group II and Group VI elements, for example zinc selenide and zinc sulfide, and (c) those materials crystallizing in face centered cubic structure such as silver, gold, nickel, copper and alpha silicon carbide. A further class of materials which can be grown by this technique are the ternary zinc blende semiconductors, of which zinc tin arsenide is an example. Such material crystals are often very difficult to prepare because of the differing vapor pressures of the individual constituents.

The process of this invention is a solution growth of a solute material. A melt or solution is prepared wherein a solute, whose crystals are to be produced in dissolved in a solvent. It is then, in this melt, that the solute crystals are formed by carefully cooling the solution so as to promote the formation of the desired crystal structure as opposed to the formation of randomly and irregularly shaped members. Crystal growth from solution, generally speaking, has at least one major advantage over growth from an essentially solute melt. This advantage is that the operation is performed at a lower temperature thus tending to eliminate, or at least minimize, problems such as solute vapor pressure and solute decomposition attendant to the use of the higher temperatures involved in crystal growth or formation from essentially solute, that is non-solution, supercooled melts. Obviously the solvent must have a lower melting point than the solute; thus the solute will tend to crystallize upon lowering the temperature of the solute-solvent melt while the solvent tends to remain liquid. Such mixtures exhibit a minimum melting point composition or eutectic mixture as indicated by 31 in FIG. 7. In this respect it is to be noted that any composition selected should be on the solute side of any such eutectic. Otherwise solute crystals will not form on cooling.

As can be seen from the examples tabulated in the tables there are many solution compositions suitable for use in the invention. Basically, it can be said that when growing compounds comprising stoichiometric proportions of Group III and Group V elements the solvent may be the Group III element. However, the solvent is not necessarily limited to that particular Group III element or any Group III element as is shown by the examples in Table II. Note Examples 15, 16 where gallium antimonide crystals are grown from tin and lead solvents. Actually, for a given solute, the solute being the material from which it is desired to grow crystals, the essential limits on the solvent chosen are (1) suitable melting point, (2) solvent compatibility with the solute, and (3) the solvent must be removable, by chemical or physical means to isolate the solute crystals. The solvent melting point is generally suitable when it or any eutectic it may form with the solute, is below that of the solute. For many solutes, however, the solvent melting point should be as low as consistent with solution growth of the solute. Examples of such solutes are those which cannot sustain elevated temperatures without partial decomposition such as phosphides and arsenides. By solvent compatibility with solute it is meant that the solvent is miscible with the solute. That is, the solvent will actually dissolve the solute to form a solution melt, but further, as a requisite of compatibility, the solvent will not contaminate the resulting solute crystal to an excessive extent. Also, since the solute crystals can be removed from the solidified solution by chemical solvent dissolution, if such a solvent removal method is selected the solvent obviously must be capable of such chemical removal without injury to the solute crystals.

Crystals grown by the process of the invention for most applications should be flat or platelet in configuration. Extended lengths formed by the modification of the invention also will generally be flat. In the latter case, of course, the shape of the extended platelet, in general, will conform to the shape of the seed crystal. However, it is to be noted that in the practice of the invention, crystals exhibiting twin planes but not characterized by a flat shape may also be formed. Examples are the novel configuration shown in FIGS. 3, 4, 5 and 6. Referring to FIGS. 3 and 4, several examples of these shapes are shown in cross sections. These cross sections are taken at a 110 plane with the crystal growth and the twin planes extending perpendicular to this section. For convenience purposes, these shapes are designated Type I configurations as opposed to the Type II configurations shown in FIGS. 5 and 6. These shapes, Type I, are regular in cross section and are bounded by an even numbered plurality of at least eight 111 planes. Several possible configurations are indicated in FIG. 3. A convenient aid in analyzing these shapes and of visualizing other possible shapes is to consider them as constructed of basic rhombohedral blocks such as 90 in FIG. 3f without internal twin planes and bounded by 111 planes such as 92 through 94 in FIG. 3f. In visualizing such other possible shapes, two such basic rhombohedral blocks may be placed together in a twinned or untwinned relationship; however, the twinning laws must be obeyed when they are placed in a twinned relationship. Furthermore, it is necessary that the sum of the twin planes in a path around the periphery must be an even number.

The structures shown in FIGS. 3a and 3d have been observed quite often in the practice of the basic solution growth invention for germanium and silicon solutes and also for compound solutes, the compound comprising an element selected from Group III of the Periodic Table combined with an element selected from Group V of the Periodic Table. These are apparently very favorable configurations. That is when they occur, they give an extended form considerably longer than any other crystal from the same solution melt. The other structures in FIG. 3 occur somewhat less frequently. Such structures offer good possibilities for growth from supercooled solute melts. The relatively small forms easily obtained from solution growth can be used as seeds for super-cooled melt growth. These crossed twin plane configurations provide a more distributed nucleation and growth front system than the single system with two or more parallel twin planes which currently is used in growth from super-cooled melts. This improved growth front should offer advantages in permitting faster crystal growth from melts and also producing a more uniform impurity distribution. The presence of the crossed twin planes should retard any tendency to breakup into {211} or H-arm type growth. This general type of configuration might be extended to include a number of cross twins, such as indicated in FIG. 4, which could stabilize a very wide growth front, thus facilitating the production of material in sheet form. The structures shown in FIGS. 3 and 4 are perfectly twinned with no mismatch boundaries. Such crystals would be quite satisfactory for semiconductor devices.

Referring now to FIGS. 5 and 6 which indicate the configurations designated Type II for convenience purposes, there are shown various cross sections with irregular outlines. Basically this type of configuration can be visualized as twinning joined at a point such as 100 in FIG. 5 with each successive twin plane spaced 70°-32′, or a multiple thereof, apart. FIG. 5 shows such a structure exhibiting five intersecting twin planes and FIG. 6 shows several examples exhibiting 2, 3, 4 and 6 twinned planes. The cross sections are {110} cross sections and the growth and the twin planes would extend perpendicular to this section. The dotted lines, such as 101 through 104 in FIG. 5, indicate the peripheries to which monocrystalline re-entrancies will normally grow out. It will be noticed that there will be a mismatch boundary, indicated as a crossed broken line, such as 108 in FIG. 5, in one segment of the cross section in all cases except structures shown in FIGS. 6a and 6g. This mismatch boundary is necessary because the twinning operations do not return to the same orientation. That is, a 360° periphery cannot be divided evenly into 70°-32′ segments. The mismatch boundary apparently enters into the nucleation process in crystal growth which furnishes new layers and thus enhances extended growth. Some of these configurations particularly that in FIG. 5 should be capable of extended propagation in supercooled melts. Because of the pronounced {100} faceting often encountered in the growth of crystals of materials comprising an element selected from Group III of the Periodic Table combined with an element from Group V of the Periodic Table, the intersecting configurations shown in FIGS. 5 and 6 may be particularly useful in obtaining extended crystal growth of these compounds. The {100} faceting can cause monocrystalline re-entrancies to form on the sections as shown in FIGS. 5 and 6 thus producing the growth which produces the dotted line configuration indicated in these figures. Some of these shapes offer considerable promise in highly specialized semiconductor applications. In the event such a crystal is desired, the appropriate seed would be formed by the solution growth process of the basic invention and then extended in length by the modification of the basic invention so as to provide suitable quantity of the crystal.

It can be seen that this inveniton offers a process for the growth of crystals, exhibiting twinned planes, of materials which are often difficult to grow by other known processes. The invention also provides for members exhibiting twin planes extending therethrough, some of which may exhibit at least two of the planes intersecting thereby furnishing a more distributed growth front system. Such a growth front system makes such a configuration often desirable as a seed for growth from a nonsolution melt where an increased growth or pulling rate is desired. Also the invention provides a method of extending the length of crystals so grown or of any other crystal capable of growth in solution by the re-entrant edge mechanism. Thus, extended lengths of materials often very difficult to form by other methods may be obtained. Further, it can be seen that the invention provides a process of producing semiconductor members exhibiting alternating semiconductivity type layers or members with variable resistivity striations directly from solution growth without use of the various relatively cumbersome processes currently required in the formation of such members.

It is to be understood that the above description, drawings and examples are illustrative and not in limitation of the invention or its application.

Further, it is not intended to limit the application of the invention to the semiconductor field.

What is claimed is:

1. A process for producing a crystalline body of a solid material, said material crystallizing in a lattice structure of one of the following types face centered cubic, diamond cubic, zinc blende, hexagonal and orthohombic, and capable of crystal growth in solution by a twin plane re-entrant edge mechanism, comprising the steps (1) forming a solution melt consisting of said material in a solvent, the temperature of the melt being at substantially the liquidus temperature of the solution, and (2) cooling the melt at a relatively slow rate of from 0.1° C./min. to 3° C./min., the rate being below that which would induce substantial crystal growth by mechanisms other than the twin plane re-entrant edge mechanism, whereby to produce said crystalline member, said crystalline member being grown entirely within the solution melt.

2. A process for producing a doped crystalline body of a solid material, said material crystallizing in a lattice structure of one of the following types face centered cubic, diamond cubic, zinc blende, hexagonal and orthorhombic, and capable of crystal growth in solution by a twin plane re-entrant edge mechanism, comprising the steps (1) forming a solution melt consisting of said material and a dopant in a solvent, the temperature of the melt being at substantially the liquidus temperature of the solution, and (2) cooling the melt at a relatively slow rate of from 0.1° C./min. to 3° C./min., the rate being below that which would induce substantial crystal growth by mechanisms other than the twin plane re-entrant edge mechanism, whereby to produce said crystalline member, said crystalline member being grown entirely within the solution melt.

3. A process for producing crystalline members in extended lengths of a solid material, said material crystallizing in a lattice structure of one of the following types face centered cubic, diamond cubic, zinc blende, hexagonal and orthorhombic, and capable of crystal growth in solution by the twin plane re-entrant edge mechanism comprising the steps (1) forming a solution melt consisting of the material and a solvent, the temperature of the melt being at substantially the liquidus temperature of the solution and having in contact therewith at least one seed crystal of said material, said seed crystal exhibiting, extending therethrough, at least two twin planes if the material exhibits a diamond cubic, zinc blende or face centered cubic lattice structure, one twin plane being otherwise sufficient, said twin planes being aligned in the direction of desired crystal growth, and (2) cooling the melt starting in the vicinity of the seed crystal to supersaturate the melt with the material, whereby the material solidifies preferentially upon the seed crystal and continuing said cooling in the direction of desired crystal growth, said cooling being accomplished at a relatively slow rate of from 0.1° C./min. to 3° C./min., the rate being below that which would induce substantial crystal growth by mechanisms other than the twin plane re-entrant edge mechanism, whereby to produce an elongated crystal similar in cross-sectional structure to said seed crystal, said crystalline member being grown entirely within the solution melt.

4. A process for producing crystalline members of a material, said material crystallizing in a lattice structure of one of the following types face centered cubic, diamond cubic, zinc blende, hexagonal and orthorhombic, and capable of crystal growth in solution by the re-entrant edge mechanism, comprising the steps (1) forming a solution melt consisting of the material in a solvent, the temperature of the melt being at substantially the liquidus temperature of the solution, (2) initially cooling the melt at a rate of temperature decrease fast enough to effect super-cooling sufficient to induce the formation of twinned crystal nuclei, and (3) further cooling the melt at a relatively slow rate of temperature decrease, the rate being below that which would induce substantially crystal growth by mechanisms other than the twin plane re-entrant edge mechanism, whereby to produce said crystalline member, said crystalline member being grown entirely within the solution melt.

5. A process for producing a crystalline member of a material selected from group consisting of aluminum, gallium, indium, thallium, silicon, germanium, the phosphides, arsenides, and antimonides of aluminum, gallium, indium, zinc and thallium, said material crystallizing in a lattice structure of one of the following types face centered cubic, diamond cubic, zinc blende, hexagonal and orthorhombic, the steps comprising (1) forming a solution melt consisting of the material and a solvent selected from the group consisting of aluminum, gallium, antimony, indium, tin, gold, silver and lead, the temperature of the melt being at substantially the liquidus temperature of the solution, and (2) cooling the melt at a relatively slow rate of from 0.1° C./min. to 3° C./min. of about up to 3° centigrade per minute so as to effect super-cooling sufficient to induce crystal growth by the re-entrant edge mechanism but not sufficient to induce substantial crystal growth of the other mechanisms whereby to produce said crystalline member, said crystalline member being grown entirely within the solution melt.

6. A process for producing crystalline members in extended lengths of a material selected from the group consisting of aluminum, gallium, indium, thallium, silicon, germanium, the phosphides, arsenides, and antimonides of aluminum, gallium, indium, zinc and thallium, said material crystallizing in a lattice structure of one of the following types face centered cubic, diamond cubic, hexagonal and orthorhombic, comprising the steps (1) forming a solution melt consisting of the material and a solvent selected from the group consisting of aluminum, gallium, antimony, indium, tin, gold, silver, lead, the temperature of the melt being at substantially the liquidus temperature, and (2) having in contact therewith at least one seed crystal of said material, said seed crystal exhibiting extending therethrough at least two twinned planes if the material exhibits a diamond cubic, face centered cubic or zinc blende lattice structure, one twin plane being otherwise sufficient, said twin planes being aligned in the direction of desired crystal growth, and (3) cooling the melt starting in the vicinity of the seed crystal at a relatively slow cooling rate of about up to 3° centigrade per minute so as to effect sufficient super-cooling to induce preferential crystal growth upon the seed by the reentrant edge mechanism but not sufficient, however, to induce substantial crystal formation or growth by other mechanisms and continuing said cooling in the direction of desired crystal growth, thereby to produce an elongated crystal similar in cross-sectional structure to said seed crystal, said crystalline member being grown entirely within the solution melt.

7. A process for producing crystalline members of a material selected from the group consisting of aluminum, gallium, indium, thallium, silicon, germanium, the phosphides, arsenides and antimonides of aluminum, gallium, indium, zinc and thallium, said material crystallizing in a lattice structure of one of the following types face centered cubic, diamond cubic, zinc blende, hexagonal and orthorhombic, comprising the steps; (1) forming a solution melt consisting of the material and a solvent selected from the group consisting of aluminum, gallium, antimony, indium, tin, gold, silver and lead, the temperature of the melt being at substantially the liquidus temperature of the solution and (2) cooling the melt by about from 3° to 30° centigrade in a short period of time so as to effect super-cooling sufficient to induce the formation of crystals exhibiting twin planes extending therethrough, and (3) further cooling the melt at a relatively slow rate of temperature decrease of about up to 3° C. per minute so as to effect super-cooling sufficient to induce crystal growth by the re-entrant edge mechanism on the crystals having twin planes as formed in step (2) but not sufficient to induce any substantial crystal growth by other mechanisms whereby to produce said crystalline members, said crystalline member being grown entirely within the solution melt.

8. A process for producing crystalline bodies of germanium, comprising the steps (1) forming a solution melt, the melt consisting of germanium solute and at least one solvent selected from the group consisting of gallium, tin, aluminum, gold, lead, silver and indium, said germanium solute comprising about from 3% to 34% by weight of said melt, the balance of said melt consisting of said solvent, the temperature of said melt being brought to substantially the liquidus temperature of the solution (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said germanium solute to crystallize into said crystalline bodies, said crystalline member being grown entirely within the solution melt.

9. A process for producing doped crystalline bodies of germanium, comprising the steps (1) forming a solution melt consisting of germanium solute, a doping material, and at least one solvent selected from the group consisting of gallium, tin, aluminum, gold, lead, silver and indium, said germanium solute comprising about from 3% to 34% by weight of said melt, the balance of said melt consisting of said solvent and said dopant material, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said germanium solute to crystallize into said crystalline bodies, said crystalline member being grown entirely within the solution melt.

10. A process for producing crystalline bodies of silicon, comprising the steps (1) forming a solution melt consisting of silicon solute and at least one solvent selected from the group consisting of aluminum, gold, silver, gallium, tin and zinc, said silicon solute comprising about from 1% to 25% by weight in excess of the eutectic composition of said melt, the balance consisting of said solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said silicon solute to crystallize into said crystalline bodies, said crystalline member being grown entirely within the solution melt.

11. A process for producing crystalline bodies of indium antimonide, comprising the steps (1) forming a solution melt consisting of indium antimonide solute and at least one solvent selected from the group consisting of mercury, lead, tin and indium, said indium antimonide solute comprising about 5% to 50% by weight of said melt, the balance of said melt consisting of said solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said indium antimonide solute to crystallize into said crystalline bodies, said crystalline member being grown entirely within the solution melt.

12. A process for producing crystalline bodies of indium arsenide, comprising the steps (1) forming a solution melt consisting of indium arsenide solute and indium solvent, said indium arsenide solute comprising about from 2% to 15% by weight of said melt, the balance of said melt consisting of said indium solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said indium arsenide solute to crystallize into said crystalline bodies, said crystalline member being grown entirely within the solution melt.

13. A process for producing crystalline bodies of indium phosphide, comprising the steps (1) forming a solution melt consisting of indium phosphide solute and indium solvent, said indium phosphide solute comprising about from 2% to 25% by weight of said melt, the balance of said melt consisting of said indium solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said indium phosphide solute to crystallize into said crystalline bodies, said crystalline member being grown entirely within the solution melt.

14. A process for producing crystalline bodies of gallium antimonide, comprising the steps (1) forming a solution melt consisting of gallium antimonide solute and at least one solvent selected from the group consisting of gallium, tin and lead, said gallium antimonide solute comprising about from 5% to 30% by weight of said melt, the balance of said melt consisting of said solvent, the temperature of said melt being brought to substantially the liquidus temperature of the solution and (2) cooling said melt at a temperature rate of about .7° C. per minute, so as to effect supercooling sufficient to induce crystal growth by the re-entrant edge mechanism, said super-cooling effect not being sufficient, however, to induce substantial crystal growth by other mechanisms, thereby to cause said gallium antimonide solute to crystallize into said crystalline bodies, said crystalline member being grown entirely within the solution melt.

15. A process for producing crystalline platelets of gallium arsenide, comprising the steps (1) forming a solution melt consisting of gallium arsenide solute and gallium solvent, said gallium arsenide comprising about from 1% to 15% by weight of said melt, the balance of said melt consisting of said gallium solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said gallium arsenide solute to crystallize into said crystalline platelets, said crystalline member being grown entirely within the solution melt.

16. A process for producing crystalline bodies of gallium phosphide, comprising the steps (1) forming a solution melt, the melt consisting of germanium solute and at least one solvent selected from the group consisting of gallium, tin, bismuth and indium, said germanium solute comprising about from .5% to 5% by weight of said melt, the balance of said melt comprising essentially said solvent, the temperature of said melt being brought to substantially the liquidus temperature and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said gallium phosphide solute to crystallize into said crystalline platelets, said crystalline member being grown entirely within the solution melt.

17. A process for producing crystalline bodies of aluminum antimonide, comprising the steps (1) forming a solution melt consisting of aluminum antimonide solute and aluminum solvent, said aluminum antimonide solute comprising about 5% to 20% by weight of said melt, the balance of said melt consisting of said aluminum solvent, the temperature of said melt being brought to substantially the liquidus of the solution point and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said aluminum antimonide solute to crystallize into said crystalline bodies, said crystalline member being grown entirely within the solution melt.

18. A process for producing crystalline bodies of aluminum arsenide, comprising the steps (1) forming a solution melt consisting of aluminum arsenide solute and aluminum solvent, said aluminum arsenide solute comprising about .5% to 5% by weight of said melt, the balance of said melt consisting of said aluminum solvent, the temperature of said melt being brought to substantially the liquidus temperature of the solution (2) slowly cooling said melt at a temperature rate of about up to 3° centrigrade per minute, so as to effect super-cooling sufficient to induce crystal growth by the re-entrant edge mechanism, said super-cooling effect not being sufficient, however, to induce substantial crystal growth by other mechanisms, thereby to cause said aluminum arsenide solute to crystallize into said crystalline bodies, said crystalline member being grown entirely within the solution melt.

19. A process for producing crystalline bodies of tin-zinc arsenide, comprising the steps (1) forming a solution melt consisting of tin-zinc arsenide solute and tin solvent, said tin-zinc arsenide solution comprising about from 5% to 20% by weight of said melt, the balance of said melt consisting of said tin solvent, the temperature of said melt being brought to substantially the liquidus temperature and (2) cooling said melt at a temperature rate of about .7° C. per minute, so as to effect super-cooling sufficient to induce crystal growth by the re-entrant edge mechanism, said super-cooling effect not being sufficient, however, to induce substantial crystal growth by other mechanisms, thereby to cause said tin-zinc arsenide solute to crystallize into said crystalline bodies, said crystalline member being grown entirely within the solution melt.

20. A process for producing crystalline bodies of alpha silicon carbide, comprising the steps (1) forming a solution melt, the melt consisting of alpha silicon carbide solute and at least one solvent selected from the group consisting of silicon and chromium, said alpha silicon carbide solute comprising about from .1% to 1% by weight of said melt, the balance of said melt consisting of said solvent, the temperature of said melt being brought to substantially the liquidus temperature of the solution and (2) slowly cooling said melt at a temperature rate of about up to 3° centigrade per minute, so as to effect super-cooling sufficient to induce crystal growth by the re-entrant edge mechanism, said super-cooling effect not being sufficient, however, to induce substantial crystal growth by other mechanisms, thereby to cause said alpha silicon carbide solute to crystallize into said crystalline bodies, said crystalline member being grown entirely within the solution melt.

21. A process for producing crystalline members of a semiconductor material, the member being characterized by at least two layers of alternating semi-conductivity, said material crystallizing in a lattice structure of one of the following types face centered cubic, diamond cubic, hexagonal and orthorhombic, and capable of solution crystal growth by the re-entrant edge mechanism, comprising the steps (1) forming a solution melt consisting of the material, a solvent and dopants of both semi-conductivity types, one of said dopants tending to be accepted into the crystalline growth, the other tending to be rejected by the crystalline growth, the temperature of the melt being at substantially the liquidus temperature of the solution, and (2) slowly cooling the melt at a rate of from 0.1° C./min. to 3° C./min. below that which would induce any substantial crystal growth by mechanisms other than the twin plane re-entrant edge mechanism whereby to produce said crystalline member exhibiting said alternating semiconductivity layers, said crystalline member being grown entirely within the solution melt.

22. A process for producing crystalline members of a semiconductor material, the member being characterized by at least two layers of alternating semi-conductivity, said material crystallizing in a lattice structure of one of the following types face centered cubic, diamond cubic, hexagonal and orthorhombic, and capable of solution crystal growth by the re-entrant edge mechanism, comprising the steps (1) forming a solution melt consisting of the material, a solvent and dopants of both semiconductivity types, the dopants and their respective concentrations in the melt being selected such that the first type semiconducivity dopant tends to predominate in the crystal at relatively slow crystal growth rates, the second type dopant tending to predominate doping at faster growth rates and (2) slowly cooling the melt at a rate of from 0.1° C./min. to 3° C./min. below that which would induce any substantial crystal growth by mechanisms other than the twin plane re-entrant edge mechanism and, within this slow cooling rate range, alternately varying the cooling rate of the melt between the relatively slow cooling rate, which tends to effect a predominance of the first type dopant in the crystal growth, and the faster cooling rate, which tends to effect a predominance of the second type dopant in the crystal growth, thereby to produce said crystalline member exhibiting said alternating semiconductivity layers, said crystalline member being grown entirely within the solution melt.

23. A process for producing crystalline members of a semiconductor material, the member being characterized by two zones of alternating semiconductivity, said material crystallizing in a lattice structure of one of the following types face centered cubic, diamond cubic, zinc blende, hexagonal and orthorhombic, and capable of solution crystal growth by the re-entrant edge mechanism, comprising the steps (1) forming a solution melt consisting of the material, a solvent and a dopant of the first semiconductivity type, the temperature of the melt being at substantially the liquidus temperature of the solution, and (2) introducing into the melt a quantity of twinned crystals of the said material doped with the second type of semiconductivity, the said twinned crystals exhibiting extending therethrough at least two twin planes if the material exhibits a diamond cubic, zinc blende or face centered cubic lattice structure, one twin plane being otherwise sufficient, and (3) slowly cooling the melt at a rate of from 0.1° C./min. to 3° C./min. below that which would induce any substantial crystal growth by mechanisms other than the twin plane re-entrant edge mechanism whereby to produce said crystalline member exhibiting said alternating semiconducitivity layers, said crystalline member being grown entirely within the solution melt.

References Cited by the Examiner

UNITED STATES PATENTS

| | | | |
|---|---|---|---|
| 3,031,403 | 4/1962 | Bennett | 148—1.6 |
| 3,088,853 | 5/1963 | Harper | 148—1.6 |
| 3,124,489 | 3/1964 | Vogel et al. | 148—1.6 |
| 3,130,040 | 4/1964 | Faust et al. | 75—.5 |
| 3,132,022 | 5/1964 | Luborsky et al. | 75—.5 |

OTHER REFERENCES

Bennett et al.: Physical Review, vol. 116, Oct. 1, 1959, pp. 53–60.

Dawson: Proceedings of Royal Society of London, vol. 214, Series A, August 1952, pp. 72–79.

Hamilton et al: Journal of Applied Physics, vol. 31, July 1960, pp. 1163–1168.

Longini et al.: Journal of Applied Physics, vol. 31, July 1960, pp. 1204–1207.

Stranski: Discussions of Faraday Society, vol. 5, 1949, p. 69.

DAVID L. RECK, *Primary Examiner.*

N. F. MARKVA, *Assistant Examiner.*